(12) United States Patent
Bruchmann et al.

(10) Patent No.: US 8,501,280 B2
(45) Date of Patent: Aug. 6, 2013

(54) USE OF HIGH-FUNCTIONALITY HIGHLY BRANCHED POLYETHERAMINE POLYOLS TO COAT SURFACES

(75) Inventors: Bernd Bruchmann, Freinsheim (DE); Daniel Schönfelder, Mannheim (DE); Frank Dietsche, Schriesheim (DE); Eva Wagner, Bad Dürkheim (DE); Reinhold Schwalm, Wachenheim (DE); Jürgen Kaczun, Wachenheim (DE)

(73) Assignee: BASF SE (DE)

( * ) Notice: Subject to any disclaimer, the term of this patent is extended or adjusted under 35 U.S.C. 154(b) by 581 days.

(21) Appl. No.: 12/682,223

(22) PCT Filed: Oct. 8, 2008

(86) PCT No.: PCT/EP2008/063476
§ 371 (c)(1),
(2), (4) Date: Apr. 8, 2010

(87) PCT Pub. No.: WO2009/047269
PCT Pub. Date: Apr. 16, 2009

(65) Prior Publication Data
US 2010/0216361 A1 Aug. 26, 2010

(30) Foreign Application Priority Data
Oct. 9, 2007 (EP) .................................. 07118076

(51) Int. Cl.
*B05D 1/00* (2006.01)
(52) U.S. Cl.
USPC ...................... 427/384; 427/385.5; 427/388.1
(58) Field of Classification Search
None
See application file for complete search history.

(56) References Cited

U.S. PATENT DOCUMENTS

| | | |
|---|---|---|
| 2,178,173 A | 10/1939 | Katzman et al. |
| 2,290,415 A | 7/1942 | DeGroote |
| 2,407,895 A | 9/1946 | Monson et al. |
| 4,404,362 A | 9/1983 | Bellos |
| 4,459,220 A | 7/1984 | Bellos |
| 4,931,065 A | 6/1990 | Baumgarte et al. |
| 5,015,754 A | 5/1991 | Dix et al. |
| 5,234,626 A | 8/1993 | Fikentscher et al. |
| 5,393,463 A | 2/1995 | Fikentscher et al. |
| 5,770,650 A | 6/1998 | McGee et al. |
| 2007/0049503 A1* | 3/2007 | Stokes et al. .................. 508/192 |
| 2007/0208157 A1* | 9/2007 | Posey et al. ..................... 528/44 |
| 2008/0193648 A1* | 8/2008 | Becker et al. ................. 427/288 |

FOREIGN PATENT DOCUMENTS

| | | |
|---|---|---|
| CS | 265929 | 3/1989 |
| DE | 4003243 A1 | 8/1991 |
| DE | 4104834 A1 | 9/1991 |
| EP | 0441198 A2 | 8/1991 |
| WO | WO-2005089480 A2 | 9/2005 |
| WO | WO-2007125038 A2 | 11/2007 |

OTHER PUBLICATIONS

Original patent and translation of CS 265929, Nov. 1989.*
English Translation, International Preliminary Report on Patentability, PCT/EP2008/063476, mailed Aug. 5, 2010.

* cited by examiner

*Primary Examiner* — Erma Cameron
(74) *Attorney, Agent, or Firm* — Novak Druce Connolly Bove + Quigg LLP

(57) ABSTRACT

The use of high-functionality highly branched polyetheramine polyols to coat substrates such as metal surfaces or components made of plastic permits improved adhesion of further coatings.

11 Claims, No Drawings

USE OF HIGH-FUNCTIONALITY HIGHLY BRANCHED POLYETHERAMINE POLYOLS TO COAT SURFACES

CROSS REFERENCE TO RELATED APPLICATIONS

This application is a National Phase filing under 35 U.S.C. §371 of PCT/EP2008/063476 filed Oct. 8, 2008, which claims priority to Patent Application No. 07118076.4, filed in Europe on Oct. 9, 2007. The entire contents of each of the above-applications are incorporated herein by reference.

The present invention relates to the use of highly branched polyetheramine polyols which carry a multiplicity of functional groups, based more particularly on dialkanolamines and/or trialkanolamines, to coat substrates, more particularly to coat surfaces made of plastic, wood, glass, ceramic materials, textile materials or metal.

The high-functionality highly branched polyetheramine polyols can be used as adhesion promoters (primers), thixotropic agents or flow improvers or as building blocks for the preparation of polyaddition polymers or polycondensation polymers, such as, for example, paints, coatings, adhesives, sealants, elastomers or foams, with technical advantages. Additionally they can be used, with technical advantages, as adhesion promoters (primers), flow improvers or thixotropic agents for producing paints, coatings, adhesives, sealants or foams that are based on polymers which can be obtained on the basis of addition polymerizations.

Various adhesion promoters (primers) are described in WO 2005/089480, where linear or branched polyethylenimines with molecular weights of below 10 000 are applied together with a solvent to a surface.

It is known that polyetheramine polyols are obtained from trialkanolamines, such as triethanolamine, tripropanolamine, triisopropanaolamine, if appropriate also in a mixture with mono- or dialkanolamines, for example, by etherifying these monomers with catalysis, acidic or basic catalysis for example, and with elimination of water.

The preparation of these polymers is described in, for example, the patents U.S. Pat. Nos. 2,178,173, 2,290,415, 2,407,895, and DE 40 03 243. The polymerization may either take place randomly or it is possible to prepare block structures comprising individual alkanolamines, which are linked with one another in a further reaction (see U.S. Pat. No. 4,404,362).

The polyetheramine polyols described in the literature are used in free or quaternized form as, for example, demulsifiers for oil/water mixtures, aftertreatment agents for dyed leathers (see DE 41 04 834) or lubricants for metalworking (see CS 265929).

Further described in the literature are various methods of applying a protective coat to diverse substrates. EP 06113119.9, an unpublished patent application with an earlier priority date, describes a method of applying anticorrosion coats comprising polymeric materials to a metallic surface by means, for example, of coil coating.

One object of the present invention is to provide coatings for diverse substrates (metallic and nonmetallic) which are based on specific polyetheramine polyols, which can be prepared by means of technically simple and inexpensive processes, in the form of high-functionality and highly branched polymers, and whose structures are readily adaptable to the requirements of the coating in question.

On the basis of their defined construction, the coatings are intended to combine advantageous properties, such as high functionality, high reactivity, low viscosity, and good solubility. It is also intended that they will be able to be used as an adhesion promoter component (primer) in the preparation of polyaddition polymers or polycondensation polymers, such as of paints, coatings, adhesives, sealants, elastomers or foams, for example.

This object can be achieved in accordance with the invention by using specific high-functionality and highly branched polyetheramine polyols as a coating material. The present invention accordingly provides the use of high-functionality highly branched polyetheramine polyols to coat substrates.

The substrates may be, for example, plastics, wood, glass, ceramic materials or metal, or surfaces made of these materials. The substrates may also be textile materials (woven or knitted, for example) comprising natural materials (wool or cotton, for example) and/or synthetic materials (polyester, polyamide, for example).

The invention also provides for the use of high-functionality highly branched poly-etheramine polyols constructed from trialkanolamine monomers and, if appropriate, further monomer types.

The high-functionality highly branched polyetheramine polyol may preferably be a polymer constructed from triethanolamine monomers, triisopropanolamine monomers and/or tripropanolamine monomers.

The invention also provides for the use, wherein the polymers are prepared by condensation of trialkanolamine monomers with acidic or basic catalysis at a temperature of 150 to 300° C., it being possible if appropriate for these condensation products to be subjected to further derivatization.

The invention also provides for the use, wherein the high-functionality highly branched polyetheramine polyol comprises polymers having a weight-averaged molecular weight of 2000 to 300 000 g/mol.

It is favorable to use a condensation product of triethanolamine monomers and/or triisopropanol-amine monomers, more particularly of triethanolamine monomers.

The invention also provides a method of coating substrates with high-functionality highly branched polyetheramine polyols, wherein a composition comprising at least one high-functionality highly branched polyetheramine polyol is applied to a substrate which has been precleaned (in one or more steps) if appropriate.

In the case of the method the amount of high-functionality highly branched poly-etheramine polyol per square meter of substrate is from 1 mg to 1000 g, preferably from 10 mg to 200 g, more particularly from 50 mg to 150 g. This amount is dependent on the substrate used, on the nature of the composition (e.g., as a primer), and on the end use.

The invention also provides a method in which the high-functionality highly branched polyetheramine polyol is present in an amount of 0.1% to 90%, preferably of 0.5% to 80%, more particularly 1% to 70% by weight in the composition used.

The invention also relates to a method wherein the high-functionality highly branched polyetheramine polyol is applied for the purpose of applying an anticorrosion coat to a metallic surface, more particularly one made of iron, steel, zinc or zinc alloys, aluminum or aluminum alloys, copper or copper alloys.

The invention further relates to a method, wherein at least one solvent and the high-functionality highly branched polyetheramine polyol are present in an amount of 0.5% to 80% by weight in the composition used.

Also provided is a method wherein the thickness of the coat applied to the substrate by coating is from 1 nm to 200 μm, preferably from 3 nm to 200 μm, and more particularly from 10 nm to 100 μm.

The invention also provides a substrate provided with a coating obtainable by a method as described above.

The substrate may also be a metallic surface, one, for example, made of iron, steel, zinc or zinc alloys, aluminum or aluminum alloys, copper or copper alloys. Alternatively it may be a textile material. The substrate may also have a surface made of plastic, wood, ceramic material or glass.

The invention also provides a substrate which has been coated with two or more coats, 2 to 20 coats for example, more particularly 2 to 8 coats. These polymer coats may be alike or different.

The substrate may for example be a shaped metal article, a metal strip, an automobile body or a bodywork part. The substrate may also be a plastics molding (of ABS or polyamide, for example), a film (of polyester, for example) or granules.

A high-functionality polyetheramine polyol for the purposes of this invention is a polymeric product which in addition to the ether groups and the amino groups, which form the polymer backbone, has also—terminally and/or pendently—at least three, preferably at least six, more preferably at least ten, functional groups. Functional groups are, for example, hydroxyl or amino groups.

The functional groups are frequently OH groups. In principle there is no upper limit on the number of terminal or pendent functional groups, although products with a very large number of functional groups may display unwanted properties, such as high viscosity or poor solubility, for example. The high-functionality polyetheramine polyols of the present invention usually have not more than 500 terminal or pendent functional groups, preferably not more than 100 terminal or pendent functional groups.

The starting material used may be triethanolamine, tripropanolamine, triisopropanol-amine or tributanolamine, if appropriate in combination with dialkanolamines, such as diethanolamine, dipropanolamine, diisopropanolamine, dibutanolamine, N,N'-dihydroxyalkylpiperidine (alkyl=C1-C8), or are reacted in combination with poly-etherols that have a functionality of two or more and are based on ethylene oxide and/or propylene oxide. Preference, however, is given to using triethanolamine and triisopropanolamine or a mixture thereof as the starting product.

The high-functionality highly branched polyetheramines formed by the method are terminated with hydroxyl groups after the reaction, in other words without further modification. The term "highly branched" means that the polymeric chains to a high degree are connected to one another and form a three-dimensional framework.

The polyetheramine polyols dissolve readily in a variety of solvents, such as water, alcohols, such as methanol, ethanol, butanol, alcohoVwater mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

Further examples of solvents which can be used to prepare compositions with the polymers described are aromatic and/or (cyclo)aliphatic hydrocarbons and their mixtures, halogenated hydrocarbons, ketones, esters, and ethers. Preference is given to aromatic hydrocarbons, (cyclo)aliphatic hydrocarbons, alkyl esters of alkanoic acids, ketones, alkoxylated alkyl esters of alkanoic acids, and mixtures thereof. Particularly preferred are monoalkylated or polyalkylated benzenes and naphthalenes, ketones, alkyl esters of alkanoic acids, and alkoxylated alkyl esters of alkanoic acids and mixtures thereof.

Preferred aromatic hydrocarbon mixtures are those predominantly comprising aromatic $C_7$ to $C_{14}$ hydrocarbons and possibly encompassing a boiling range from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising them. Examples thereof are the Solvesso® grades from ExxonMobil Chemical, especially Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shelisol® grades from Shell. Hydrocarbon mixtures comprising paraffins, cycloparaffins, and aromatics are also available commercially under the names Kristalloel (e.g., Kristalloel 30, boiling range about 158-198° C. or Kristalloel 60: CAS No. 64742-82-1), white spirit (likewise, for example, CAS No. 64742-82-1) or solvent naphtha (light: boiling range about 155 to 180° C., heavy: boiling range about 225-300° C.).

Halogenated hydrocarbons are, for example, chlorobenzene and dichlorobenzene or its isomer mixtures. The esters are, for example, n-butyl acetate, ethyl acetate, 1-methoxyprop-2-yl acetate, and 2-methoxyethyl acetate. The ethers are, for example, THF, dioxane, and the dimethyl, diethyl or di-n-butyl ethers of ethylene glycol, diethylene glycol, triethylene glycol, propylene glycol, dipropylene glycol or tripropylene glycol.

Examples of ketones include acetone, 2-butanone, 2-pentanone, 3-pentanone, hexanone, isobutyl methyl ketone, heptanone, cyclopentanone, cyclohexanone or cycloheptanone.

Examples of (cyclo)aliphatic hydrocarbons are decalin, alkylated decalin, and isomer mixtures of linear or branched alkanes and/or cycloalkanes.

The polyetheramine polyols are prepared by methods that are known in principle, either in bulk or in solution. Suitable solvents include the solvents already cited above. In one preferred embodiment the reaction is carried out without solvent.

The temperature during the preparation ought to be sufficiently high for the reaction of the amino alcohol. In general the reaction requires a temperature of 100° C. to 350° C., preferably 150 to 300, more preferably 180 to 280° C., and especially 220 to 240° C.

The reaction is preferably followed by removal or blowoff of the monomers.

In one preferred embodiment the condensation reaction is carried out with triethanolamine or triisopropanolamine in bulk. The low molecular mass reaction products or water released during the reaction can be removed from the reaction equilibrium in order to accelerate the reaction, this removal being accomplished distillatively, for example, if appropriate also under reduced pressure. The separation of the water or of the low molecular mass reaction products can also be assisted by passing through the reaction mixture a stream of gas which is substantially inert under the reaction conditions (stripping), such as nitrogen, for example, or a noble gas, helium, neon or argon, for example.

In order to accelerate the reaction it is also possible to add catalysts or catalyst mixtures. Suitable catalysts are compounds which catalyze etherification or transetherification reactions, examples being alkali metal hydroxides, alkali metal carbonates, alkali metal hydrogencarbonates, preferably those of sodium, potassium or cesium, acidic compounds such as iron chloride or zinc chloride, formic acid, oxalic acid or acidic phosphorus compounds, such as phosphoric acid, polyphosphoric acid, phosphorous acid or hypophosphorous acid. Preference is given to using phosphoric acid, phosphorous acid or hypophosphorous acid, if appropriate in aqueous dilution.

The catalyst is added generally in an amount of 0.001 to 10 mol %, preferably of 0.005 to 7, more preferably 0.01 to 5 mol %, based on the amount of the alkanolamine or alkanolamine mixture that is used.

It is also possible, furthermore, not only by addition of the suitable catalyst but also by choice of a suitable temperature, to control the intermolecular polycondensation reaction. Moreover, the average molecular weight of the polymer can be adjusted via the composition of the starting components and via the residence time.

The polymers which are prepared at an elevated temperature are typically stable at room temperature for a prolonged period, for at least 6 weeks, for example, without exhibiting instances of clouding, precipitation and/or significant increase in viscosity.

To terminate the intermolecular polycondensation reaction there are a variety of options. For example, the temperature can be lowered to a range in which the reaction comes to a standstill and the polycondensation product is storage-stable. This is generally the case below 60° C., preferably below 50° C., more preferably below 40° C., and very preferably at room temperature. Another option is to deactivate the catalyst: in the case of basic catalysts, for example, by adding an acidic component, a Lewis acid or an organic or inorganic protic acid, for example, and, in the case of acidic catalysts, by adding a basic component, a Lewis base or an organic or inorganic base, for example. A further option is to halt the reaction by dilution with a cooled solvent. This is especially preferred when the viscosity of the reaction mixture must be adapted by addition of solvent.

The high-functionality highly branched polyetheramine polyols of the invention generally have a glass transition temperature of less than 50° C., preferably less than 30 and more preferably less than 10° C.

The OH number is usually 100 mg KOH/g or more, preferably 150 mg KOH/g or more.

The weight-average molar weight, $M_w$, is usually between 1000 and 500 000, preferably from 2000 to 300 000, and more particularly from 5000 to 300 000 g/mol.

The number-average molar weight, $M_n$, is between 500 and 50 000, preferably between 1000 and 40 000 g/mol, as measured by means of gel permeation chromatography using hexafluoroisopropanol as the mobile phase and polymethyl methacrylate (PMMA) as a standard.

The preparation of the high-functionality polyetheramine polyols of the invention takes place frequently in a pressure range from 0.1 mbar to 20 bar, preferably at 1 mbar to 5 bar, in reactors or reactor cascades, which are operated batchwise, in semibatch mode or continuously.

Through the aforementioned setting of the reaction conditions and, if appropriate, through the choice of appropriate solvent it is possible for the products of the invention, after they have been prepared, to be processed further without additional purification.

The reaction mixture can if necessary be decolorized, by means for example of treatment with activated carbon or metal oxides, such as aluminum oxide, silicon oxide, magnesium oxide, zirconium oxide, boron oxide or mixtures thereof, for example, in amounts of, for example, 0.1% to 50%, preferably 0.5% to 25%, more preferably 1% to 10%, by weight, at temperatures of, for example, 10 to 100° C., preferably 20 to 80° C. and more preferably 30 to 60° C.

If appropriate, the reaction mixture can also be filtered for the purpose of removing any precipitates present. Frequently the product is stripped—that is, freed from volatile compounds of low molecular mass. For that purpose, after the desired degree of conversion has been reached, the catalyst can optionally be deactivated and the low molecular mass volatiles, water for example, the amino alcohols or volatile oligomeric or cyclic compounds used as feedstock can be removed distillatively, if appropriate with introduction of a gas, preferably nitrogen, or noble gases, if appropriate under reduced pressure.

The high-functionality highly branched polyetheramine polyols obtained in accordance with the methods specified can be used for coatings on a variety of substrates.

They can also be used with advantage as adhesion promoters (primers), thixotropic agents, or flow improvers or as building blocks for the preparation of polyaddition polymers or polycondensation polymers, such as, for example, of paints, coatings, adhesives, sealants, casting elastomers or foams. Additionally they can be used with technical advantage as adhesion promoters (primers), flow improvers or thixotropic agents for the production of paints, coatings, adhesives, sealants or foams on the basis of polymers which can be obtained on the basis of addition polymerizations.

In a further embodiment of the present invention the polyetheramine polyols can be used as flow assistants for enhancing the rheology of coating materials, such as of clearcoat and topcoat materials, for example.

The polyetheramine polyols can be used as a binder component, in coating compositions, for example, together if appropriate with other binders containing hydroxyl groups or amino groups, such as, for example, with hydroxy (meth) acrylates, hydroxystyryl (meth)acrylates, linear or branched polyesters, polyethers, polycarbonates, melamine resins or urea-formaldehyde resins, together with compounds that are reactive toward carboxyl functions and/or hydroxyl functions, such as, for example, with isocyanates, masked isocyanates, epoxides and/or amino resins, preferably isocyanates, epoxides or amino resins, more preferably with isocyanates or epoxides, and very preferably with isocyanates.

Isocyanates are, for example, aliphatic, aromatic, and cycloaliphatic diisocyanates and polyisocyanates having an average NCO functionality of at least 1.8, preferably 1.8 to 5, and more preferably 2 to 4, and also their isocyanurates, oxadiazinetriones, iminooxadiazinediones, ureas, biurets, amides, urethanes, allophanates, carbodiimides, uretonimines, and uretdiones. The diisocyanates are preferably isocyanates having 4 to 20 C atoms. Mixtures of diisocyanates may also be present.

Suitable polyisocyanates include polyisocyanates containing isocyanurate groups, uretdione diisocyanates, polyisocyanates containing biuret groups, polyisocyanates containing amide groups, polyisocyanates containing urethane or allophanate groups, polyisocyanates comprising oxadiazinetrione groups or iminooxadiazinedione groups, carbodiimide-modified or uretonimine-modified polyisocyanates of linear or branched $C_4$-$C_{20}$ alkylene diisocyanates, cycloaliphatic diisocyanates having a total of 6 to 20 C atoms, or aromatic diisocyanates having a total of 8 to 20 C atoms, or mixtures thereof.

The diisocyanates and polyisocyanates which can be used preferably have an isocyanate group content (calculated as NCO, molecular weight=42) of 1% to 60% by weight, based on the diisocyanate and polyisocyanate (mixture), preferably 2% to 60% by weight, and more preferably 10% to 55% by weight. Preference is given to aliphatic and/or cycloaliphatic diisocyanates and polyisocyanates, or mixtures thereof. Particular preference is given to hexamethylene diisocyanate or isophorone diisocyanate as isocyanate building block.

Suitable co-components are preferably:
a) isocyanurate-group-containing polyisocyanates of aromatic, aliphatic and/or cycloaliphatic diisocyanates.
b) Uretdione diisocyanates with aromatically, aliphatically and/or cycloaliphatically attached isocyanate groups.
c) Biuret-group-containing polyisocyanates with aromatically, cycloaliphatically or aliphatically attached isocyanate groups.
d) Urethane- and/or allophanate-group-containing polyisocyanates with aromatically, aliphatically or cycloaliphatically attached isocyanate groups.
e) Polyisocyanates comprising oxadiazinetrione groups.
f) Polyisocyanates comprising iminooxadiazinedione groups.
g) Carbodiimide-modified and/or uretonimine-modified polyisocyanates.

Polyisocyanates a) to g) can be used with the polyetheramine polyols in a mixture, including, if appropriate, in a mixture with diisocyanates.

The isocyanate groups of the diisocyanates or polyisocyanates can also be present in a masked form. Examples of suitable masking agents for NCO groups include oximes, phenols, imidazoles, pyrazoles, pyrazolinones, triazoles, diketopiperazines, caprolactam or malonic esters. By masking or blocking agents are meant compounds which convert isocyanate groups into blocked (masked or protected) isocyanate groups which then do not display the typical reactions of a free isocyanate group, beneath what is called the deblocking temperature. Compounds of this kind with blocked isocyanate groups are typically employed in dual-cure coating materials or in powdercoating materials which are cured to completion via isocyanate group curing.

Epoxide compounds are those having at least one, preferably at least two, more preferably two to ten epoxide groups in the molecule. Suitable examples include epoxidized olefins, glycidyl esters (e.g., glycidyl (meth)acrylate) of saturated or unsaturated carboxylic acids, or glycidyl ethers of aliphatic or aromatic polyols. Products of this kind are available commercially in large numbers. Particular preference is given to polyglycidyl compounds of the bisphenol A, F or B type, and glycidyl ethers of polyfunctional alcohols, such as of butanediol, of 1,6-hexanediol, of glycerol, and of pentaerythritol, for example. Examples of such polyepoxide compounds are Epikote® 812 (epoxide value: about 0.67 mol/100 g) and Epikote® 828 (epoxide value: about 0.53 mol/100 g), Epikote® 1001, Epikote® 1007, and Epikote® 162 (epoxide value: about 0.61 mol/100 g) from Resolution, Rütapox® 0162 (epoxide value: about 0.58 mol/100 g), Rütapox® 0164 (epoxide value: about 0.53 mol/100 g), and Rütapox® 0165 (epoxide value: about 0.48 mol/100 g) from Bakelite AG, and Araldit® DY 0397 (epoxide value: about 0.83 mol/100 g) from Vantico AG.

Further suitable co-components are compounds containing active methylol or alkylalkoxy groups, more particularly methylalkoxy groups, such as etherified reaction products of formaldehyde with amines, such as melamine, urea, etc., phenol/formaldehyde adducts, siloxane or silane groups and anhydrides, of the kind described in U.S. Pat. No. 5,770,650; for example.

Particular preference, among the technically widespread and known, preferred amino resins, is given to the possibility of using urea resins and melamine resins, such as urea-formaldehyde resins, melamine-formaldehyde resins, melamine-phenol-formaldehyde resins or melamine-urea-formaldehyde resins, for example. Suitable urea resins are those which are obtainable by reacting ureas with aldehydes and which may if appropriate be modified. Suitable ureas are urea, N-substituted ureas or N,N'-disubstituted ureas, such as N-methylurea, N-phenylurea or N,N'-dimethylurea, for example.

Urea resins may if appropriate be partly or fully modified, as for example by reaction with monofunctional or polyfunctional alcohols, ammonia and/or amines (cationically modified urea resins) or with (hydrogen)sulfites (anionically modified urea resins), the alcohol-modified urea resins possessing particular suitability.

Suitable alcohols for the modification are $C_1$-$C_6$ alcohols, preferably $C_1$-$C_4$ alcohol, and more particularly methanol, ethanol, isopropanol, n-propanol, n-butanol, isobutanol, and secondary butanol.

Suitable melamine resins which can be used together with the polyetheramine polyols are those which are obtainable by reacting melamine with aldehydes and which may if appropriate be partly or fully modified. Suitable aldehydes in this case are, more particularly, formaldehyde, acetaldehyde, isobutyraldehyde, and glyoxal.

Melamine-formaldehyde resins are reaction products from the reaction of melamine with aldehydes, examples being the abovementioned aldehydes, more particularly formaldehyde. If appropriate the resulting methylol groups are modified by etherification with the abovementioned monohydric or polyhydric alcohols. Additionally the melamine-formaldehyde resins may also be modified as described above by reaction with amines, amino carboxylic acids or sulfites. The action of formaldehyde on mixtures of melamine and urea or on mixtures of melamine and phenol produces, respectively, melamine-urea-formaldehyde resins and melamine-phenol-formaldehyde resins which can likewise be used in accordance with the invention.

The stated amino resins are prepared by conventional methods.

Examples cited in particular are melamine-formaldehyde resins, including monomeric or polymeric melamine resins and partly or fully alkylated melamine resins, urea resins, e.g., methylolureas such as formaldehyde-urea resins, alkoxyureas such as butylated formaldehyde-urea resins, but also N-methylolacrylamide emulsions, isobutoxymethylacrylamide emulsions, polyanhydrides, such as polysuccinic anhydride, for example, and siloxanes or silanes, such as dimethyldimethoxysilanes, for example.

Particular preference is given to amino resins such as melamine-formaldehyde resins or formaldehyde-urea resins.

The coating materials in which the polyetheramine polyols of the invention can be employed as binders may be conventional basecoats, aqueous basecoats, substantially solvent-free and water-free liquid basecoats (100% systems), substantially solvent-free and water-free solid basecoats (powdercoating materials, including pigmented powdercoating materials) or substantially solvent-free powdercoating dispersions with or without pigmentation (powder slurry basecoats). They may be thermally curable, radiation curable or dual-cure systems, and may be self-crosslinking or externally crosslinking.

The high-functionality highly branched polyetheramine polyols can be used for coating substrates such as plastic (e.g., polypropylene, polyester, polyamide, PET), metal (e.g., steel, aluminum, zinc), wood (natural or processed (e.g. densified wood)), paper, textiles (natural or synthetic), leather, nonwoven, glass, ceramic, mineral building materials, such as cement moldings and fiber cement slabs, more particularly plastics, wood, and coated or uncoated metals.

Coating with the high-functionality highly branched polyetheramine polyols may take place in a conventional manner;

subsequently, if appropriate, for the removal of solvent present, drying is carried out, and curing is carried out.

The various substrates are coated by typical methods that are known in principle to the skilled worker (examples being brushing methods, spraying, knifecoating, dipping), the high-functionality highly branched polyetheramine polyols, formulated if appropriate as a composition (coating composition), being applied in the desired thickness to the substrate that is to be coated, and the volatile constituents being removed. This operation can if desired be repeated one or more times.

Application to the substrate may take place in a known way, as for example by spraying, filling, knifecoating, brushing, rolling, rollercoating or pouring. The thickness of coating in the case of this method is generally situated in a range from about 3 to 1000 g/m² and preferably 10 to 200 g/m².

The present invention is illustrated in more detail with reference to the following examples.

EXAMPLE A

General Operating Instructions for Preparing Hyperbranched Polyetheramine Polyols A four-neck flask equipped with stirrer, distillation bridge, gas inlet tube, and internal thermometer is charged with 2000 g of triethanolamine (TEA), triisopropanol-amine (TIPA) or a mixture thereof (1:1 by weight) and with 13.5 g of hypophosphorous acid in the form of a 50% strength aqueous solution, and the mixture is heated to 230° C. The formation of condensate begins slowly at about 220° C. The reaction mixture is stirred at 230° C. for 0.2 to 8 hours (see also the times indicated in table 1), during which the condensate formed in the reaction is removed by means of a moderate stream of N2 as stripping gas via the distillation bridge. Toward the end of the reaction time indicated, the residual condensate is removed under a subatmospheric pressure of 500 mbar.

When the desired degree of conversion has been reached, the batch is cooled to 140° C. and the pressure is slowly and gradually lowered to 100 mbar in order to remove any remaining volatiles. The product mixture is subsequently cooled to room temperature and analyzed.

Analysis of the products of the invention:

The polyetheramine polyols are analyzed by gel permeation chromatography using a refractometer as the detector. The mobile phase used in this case is hexafluoroisopropanol (HFIP), the standard employed for determining the molecular weight being polymethyl methacrylate (PMMA). The OH number is determined in accordance with DIN 53240, part 2.

TABLE 1

Reactants and end products

| Ex. | Amine | Reaction time (h) | Mass of distillate (g) | Molecular weight GPC (g/mol) Mn Mw | OH number of product (mg KOH/g) to DIN 53240, Part 2 |
|---|---|---|---|---|---|
| 1 | TEA | 4 | 245 | 3100 8000 | 512 |
| 2 | TEA | 4 | 260 | 4000 12 700 | 495 |
| 3 | TEA | 4 | 265 | 4500 14 000 | 460 |
| 4 | TEA | 4 | 314 | 4700 24 600 | 405 |
| 5 | TEA | 6.5 | 296 | 9000 302 000 | 360 |
| 6 | TIPA | 0.2 | 36 | 2300 2700 | 782 |
| 7 | TIPA | 0.5 | 96 | 2700 3600 | 615 |
| 8 | TIPA | 1 | 130 | 3100 4300 | 603 |
| 9 | TIPA | 4 | 221 | 5500 9400 | 429 |
| 10 | TEA/TIPA 1:1 | 4 | 240 | 4700 15 800 | 442 |

EXAMPLE B

Addition of Hyperbranched Polyetheramine Polyols to Varnishes

All varnish mixtures are prepared with a stoichiometric ratio of isocyanate groups to alcohol groups (index 100) at room temperature. The viscosities are adjusted in butyl acetate to a flow time of 20 s in accordance with ISO 2431 and EN 535 in a DIN 4 cup.

The varnishes are knife-coated at room temperature using a box-type coating bar at 180 μm wet to a metal panel substrate. The varnish film thickness after drying averages about 40 μm. As comparative examples, varnishes obtained from commercial raw materials are investigated.

The Test Methods Employed:

The varnish properties are studied after 24 hours' storage of the varnished metal panels in a controlled-climate room at 23° C. and 50% relative humidity.

After curing at 130° C., all of the varnishes studied are clear and transparent.

a) Nonvolatiles content (NVC): 1 g of the varnish mixture is dried in a forced-air oven at 125° C. for an hour, and the residual weight is determined relative to the initial value (=100%).
b) Flow time: Measured on the basis of ISO 2431 and EN 535 in a DIN 4 cup at room temperature. The figure reported is the time from the beginning of efflux until the string of liquid breaks off, in seconds.
c) König pendulum damping in number of swings, but based on DIN EN ISO 1522.

d) Erichsen cupping: Indentation test to DIN EN ISO 1520, in mm of cupping.
e) Adhesion with cross-cut to DIN 53151: A rating of 0 identifies the best score, a rating of 5 the worst score. In this regard see also Goldberg and Streitberger, BASF Handbuch Lackiertechnik, Vincentz-Verlag Hannover, 2002, page 395.
f) Acetone double-rub test: The varnish film on the metal panel is rubbed with an acetone-soaked cotton pad by hand, with double (back and forth) strokes, until the varnish film has been rubbed through down to the panel. The number of double rubs required to achieve this is reported. At a hundred rubs the test is discontinued.

g) Etch test with sulfuric acid: Using a pipette, 25 drops are applied to a gradient oven panel, which is heated in the gradient oven at 30-75° C. for 30 minutes. The panel is subsequently washed off with water and dried. The figure reported is the lowest temperature at which incipient etching is visible to the eye.

Results of the varnish studies at 130° C. curing temperature

In general the use of the hyperbranched polyetheramine polyols leads to an increase in the nonvolatiles content, to an improvement in elasticity for comparable hardness, and to improved adhesion in cross-cut (see tables 3, 6 and 7). Furthermore, the scratch resistance of the surface and the resistance of the varnishes to chemicals and to acids are improved (see table 3).

TABLE 2

Ingredients and amounts

| Ingredients (parts by weight) | Example 12 (comparative) | Example 13 | Example 14 | Example 15 | Example 16 |
|---|---|---|---|---|---|
| Macrynal ® SM636 | 53.7 | 45.0 | 41.9 | 48.8 | 51.5 |
| Polymer from example 1 | | 3.5 | | | |
| Polymer from example 2 | | | 7.4 | 1.9 | 0.9 |
| Vestanat ® T 1890 L | 32.0 | 35.8 | 33.3 | 34.2 | 33.0 |
| Butyl acetate | 41.0 | 37.0 | 36.0 | 38.0 | 38.0 |
| Nonvolatiles content (NVC, %) | 47.4 | 49.5 | 50.7 | 48.7 | 48.6 |
| Flow time (s) | 20 | 20 | 20 | 20 | 20 |

Macrynal ® SM 636 (manufacturer: UCB, Belgium), polyacrylate polyol, 70% in butyl acetate, OH number about 135 mg KOH/g
Vestanat ® T 1890 L: polyisocyanate (manufacturer: Degussa, Germany) based on the isocyanurate of isophorone diisocyanate, functionality between 3 and 4, 70% strength solution in n-butyl acetate/Solvesso 100 1:2
Basonat ® HI 100: polyisocyanate (manufacturer: BASF, Ludwigshafen) based on the isocyanurate of 1,6-hexamethylene diisocyanate, functionality between 3 and 4

It is apparent that through the use of the polyetheramine polyols, with a comparable viscosity, it is possible to reduce the fraction of volatile components (solvents).

TABLE 3

Products from table 2, characteristics of the varnishes
(the varnishes are cured at 130° C. for 30 min)

| | Example 12 (comparative) | Example 13 | Example 14 | Example 15 | Example 16 |
|---|---|---|---|---|---|
| Film thickness (μm) | 36 | 42 | 39 | 43 | 38 |
| Pendulum damping | 148 | 148 | 145 | 148 | 150 |
| Erichsen cupping (mm) | 3.0 | 4.0 | 8.5 | 7.9 | 8.5 |
| Cross-cut | 5 | 5 | 3 | 5 | 4 |
| Acetone test | >100 | >100 | >100 | >100 | >100 |
| Etching test, testing after 24 h | 61° C. | 62° C. | n.d. | n.d. | 66° C. |

It is apparent that, through the use of the polyetheramine polyols, it is possible to achieve an improvement—in some cases considerable—in the flexibility of the varnish and also an increased acid resistance.

TABLE 4

Ingredients and amounts

| Ingredients (parts by weight) | Example 17 (comparative) | Example 18 | Example 19 | Example 20 | Example 21 |
|---|---|---|---|---|---|
| Macrynal ® SM 636 | 60.0 | 45.0 | 45.0 | 45.0 | 45.0 |
| Polymer from example 3 (90% in butyl acetate) | | 5.7 | | | |
| Polymer from example 4 (90% in butyl acetate) | | | 4.9 | | |
| Polymer from example 5 | | | | 5.3 | |

TABLE 4-continued

Ingredients and amounts

| Ingredients (parts by weight) | Example 17 (comparative) | Example 18 | Example 19 | Example 20 | Example 21 |
|---|---|---|---|---|---|
| (90% in butyl acetate) | | | | | |
| Polymer from example 6 (70% in butyl acetate) | | | | | 7.0 |
| Vestanat ® T 1890 L | 26.5 | 26.5 | 26.5 | 26.5 | 26.5 |
| Basonat ® HI 100 | 4.8 | 4.8 | 4.8 | 4.8 | 4.8 |
| Butyl acetate | 41.0 | 37.0 | 36.0 | 38.0 | 38.0 |
| Nonvolatiles content (NVC, %) | 47.6% | 49.0% | 48.9% | 49.1% | 48.9% |
| Flow time (s) | 20 | 20 | 20 | 20 | 20 |

It is evident that, through the use of the polyetheramine polyols, with the same viscosity, it is possible to reduce the fraction of volatile components.

TABLE 5

Ingredients and amounts

| Ingredients (parts by weight) | Example 22 | Example 23 | Example 24 | Example 25 |
|---|---|---|---|---|
| Macrynal ® SM 636 | 45.0 | 45.0 | 45.0 | 45.0 |
| Polymer from example 7 (70% in butyl acetate) | 8.9 | | | |
| Polymer from example 8 (70% in butyl acetate) | | 9.1 | | |
| Polymer from example 9 (70% in butyl acetate) | | | 9.3 | |
| Polymer from example 10 (70% in butyl acetate) | | | | 11.6 |
| Vestanat ® T 1890 L | 26.5 | 26.5 | 26.5 | 26.5 |
| Basonat ® HI 100 | 4.8 | 4.8 | 4.8 | 4.8 |
| Butyl acetate | 39.5 | 39.5 | 39.5 | 41.0 |
| Nonvolatiles content (NVC, %) | 49.0% | 49.0% | 49.1% | 48.9% |
| Flow time (s) | 20 | 20 | 20 | 20 |

TABLE 6

Products from table 4, characteristics of the varnishes (the varnishes are cured at 130° C. for 30 min)

| | Example 17 (comparative) | Example 18 | Example 19 | Example 20 | Example 21 |
|---|---|---|---|---|---|
| Film thickness (μm) | 35 | 39 | 38 | 37 | 35 |
| Pendulum damping | 149 | 150 | 150 | 148 | 153 |
| Erichsen cupping (mm) | 5.8 | 6.7 | 6.3 | 6.1 | 6.2 |
| Cross-cut | 4 | 3.5 | 1 | 2.5 | 4 |
| Acetone test | >100 | >100 | >100 | >100 | >100 |

It is apparent that, through the use of the polyetheramine polyols, it is possible to improve the adhesion of the varnish.

TABLE 7

Products from table 5, characteristics of the varnishes (the varnishes are cured at 130° C. for 30 min; reference is example 17 from table 6)

| | Example 22 | Example 23 | Example 24 | Example 25 |
|---|---|---|---|---|
| Film thickness (μm) | 39 | 35 | 38 | 36 |
| Pendulum damping | 146 | 151 | 150 | 146 |
| Erichsen cupping (mm) | 5.9 | 7.1 | 7.5 | 7.3 |
| Cross-cut | 4 | 1.5 | 4 | 2.5 |
| Acetone test | >100 | >100 | >100 | >100 |

It is apparent that, through the use of the polyetheramine polyols, with a comparable hardness of the varnishes, it is possible to improve the adhesion and the flexibility of the varnish.

EXAMPLE C

Viscosity Investigation in Comparison to Polyethylenimines

An investigation is carried out as to what viscosity comes about in the case of 70% strength solutions of polyethylenimines. Furthermore, the viscosity possessed in relation to this by hyperbranched polyetheramines, with comparable molecular weights, is examined. The test substances used are two commercial polyethylenimines (manufacturer: BASF, Ludwigshafen):

Lupasol WF (manufacturer: BASF, Ludwigshafen) a polyethylenimine having a molecular weight of about 25 000;

Lupasol FG (manufacturer: BASF, Ludwigshafen), a polyethylenimine having a molecular weight of about 800.

Test method: Brookfield viscometer spindle 31 (0.3-60 rpm); deviation: 1% of the total measurement range; temperature change from 0-70° C. in 10° C. steps.

In the lower temperature range, Lupasol WF is too viscous, and therefore could not be measured. Hyperbranched polyetheramines exhibit a surprisingly low viscosity in comparison to standard polyethylenimines.

TABLE 8

Viscosity [mPas] in comparison with Lupasol FG as a function of temperature

| Temperature [° C.] | Lupasol FG | Polymer from example 4 |
| --- | --- | --- |
| 0 | 6100 | 9940 |
| 10 | 6950 | 3890 |
| 20 | 2450 | 1670 |
| 23 | 1850 | 1340 |
| 30 | 970 | 800 |
| 40 | 400 | 430 |
| 50 | 200 | 250 |
| 60 | 110 | 160 |
| 70 | 70 | 110 |

TABLE 9

Viscosity [mPas] of polyetheramine as a function of temperature [° C.]

| Temperature [° C.] | Lupasol WF | Polymer from example 4 | Polymer from example 2 |
| --- | --- | --- | --- |
| 0 | — | 9940 | 870 |
| 10 | — | 3890 | 1200 |
| 20 | 95 800 | 1670 | 590 |
| 23 | 68 600 | 1340 | 500 |
| 30 | 33 900 | 800 | 300 |
| 40 | 13 200 | 430 | 170 |
| 50 | 5900 | 250 | 100 |
| 60 | 2850 | 160 | 70 |
| 70 | 1500 | 110 | 50 |

EXAMPLE D

Investigation of the Throwing Power and Wetting Behavior

An investigation is carried out to determine how good the throwing power and the wetting behavior are of a test dispersion on a metal panel (ASTM A 570 Gr 36) with different additions.

Test substances:
a) Test dispersion (pH 8, 50% strength aqueous solution of a terpolymer with 46% by weight styrene/49% by weight butyl acetate/2.5% by weight acrylic acid/1.7% by weight acrylamide);
b) Polyetheramine from example 4, Lupasol WF.

Substrate:
Berghöfer panels (ST 1.0038, ASTM A 570 Gr 36).

The Berghöfer panels are precleaned with 15% HCl and dried at room temperature for 60 minutes. The cleaned test elements (7×10 cm) are immersed for 5 seconds in the corresponding solutions.
a) The test dispersion is prepared with different concentrations (1% to 15% by weight, in water).
b) The panels are first immersed in a 5% strength Lupasol WF solution and dried overnight, after which the test dispersion is applied.
c) The polymer from example 4 is introduced as an additive into the test dispersion (50/50 solids content). All of the panels are dried at room temperature overnight.

Each panel is weighed before and after to determine the film thickness. To determine the wetting behavior, the edge distance is measured and is noted as a min value and a max value. In order to determine the surface coverage, the panel is inspected.

The results obtained are as follows:
a) the panels treated with the test dispersions without an additive exhibit a distinct edge retreat at solids concentrations below 10%.
b) the panels treated with the test dispersion containing the polymer from example 4 exhibit a significantly improved throwing power and a surface coverage which is otherwise obtained only with a much higher solids concentration.

TABLE 10

Wetting behavior of various test dispersion concentrations on metal panels

| Concentration of solids-test dispersion [%] | Edge distance [mm] | Surface coverage [%] | Film thickness [µm] |
| --- | --- | --- | --- |
| 1 | 2-7 | 85 | 12 |
| 2 | 2-5 | 90 | 16 |
| 5 | 1-3 | 95 | 22 |
| 10 | 1-2 | 97 | 41 |
| 15 | 1 | 98 | 70 |
| 2 with addition of 2% of the polymer from example 4 | 1 | 98 | 64 |

The invention claimed is:

1. A method of coating substrates with high-functionality highly branched poly-etheramine polyols, wherein a composition comprising at least one high-functionality highly branched polyether amine polyol is applied to a substrate which has optionally been precleaned and
wherein the term high-functionality means that the polyether amine polyol has terminally and/or pendently at least three hydroxyl groups, and wherein the term highly branched means that the polymeric chains of the polyether amine polyol are connected to one another and form a three-dimensional framework, and wherein the polyether amine polyol comprises polymers having a weight-averaged molecular weight of 2,000 to 300,000 g/mol.

2. The method according to claim 1, wherein the amount of high-functionality highly branched polyether amine polyol per square meter of substrate is 1 mg to 1000 g.

3. The method according to claim 1, wherein the amount of high-functionality highly branched polyether amine polyol per square meter of substrate is 10 mg to 200 g.

4. The method according to claim 1, wherein the high-functionality highly branched polyether amine polyol is present in an amount of 0.1% to 90% by weight in the composition used.

5. The method according to claim 1, wherein at least one solvent and the high-functionality highly branched polyether amine polyol are present in an amount of 0.5% to 80% by weight in the composition used.

6. The method according to claim 1, wherein said at least one high-functionality highly branched polyether amine polyol is an anticorrosion coat and said substrate is a metallic surface.

7. The method according to claim 1, wherein the thickness of the coat applied to the substrate by coating is from 1 nm to 200 μm.

8. The method according to claim 1, wherein the polyether amine polyol comprises polymers having a weight-averaged molecular weight of 5,000 to 300,000 g/mol.

9. The method according to claim 1, wherein the term high-functionality means that the polyether amine polyol has terminally and/or pendently at least six hydroxyl groups.

10. The method according to claim 1, wherein the term high-functionality means that the polyether amine polyol has terminally and/or pendently at least ten hydroxyl groups.

11. The method according to claim 8, wherein the term high-functionality means that the polyether amine polyol has terminally and/or pendently at least ten hydroxyl groups.

* * * * *